US009065715B2

(12) United States Patent
Jungnickel et al.

(10) Patent No.: US 9,065,715 B2
(45) Date of Patent: Jun. 23, 2015

(54) OFDM COMMUNICATION SYSTEM WITH FAST FREQUENCY HOPS

(75) Inventors: Volker Jungnickel, Berlin (DE); Egon Schulz, München (DE); Wolfgang Zirwas, München (DE)

(73) Assignees: Nokia Solutions and Networks GmbH & Co. KG, Munich (DE); Fraunhofer Gesellschaft Zur Foerderung Der Angewandten Forschung E. V., Munich (DE)

( * ) Notice: Subject to any disclaimer, the term of this patent is extended or adjusted under 35 U.S.C. 154(b) by 1214 days.

(21) Appl. No.: 12/311,760

(22) PCT Filed: Oct. 9, 2007

(86) PCT No.: PCT/EP2007/060708
§ 371 (c)(1),
(2), (4) Date: Nov. 12, 2009

(87) PCT Pub. No.: WO2008/043757
PCT Pub. Date: Apr. 17, 2008

(65) Prior Publication Data
US 2010/0150058 A1 Jun. 17, 2010

(30) Foreign Application Priority Data
Oct. 10, 2006 (DE) .......................... 10 2006 047 978

(51) Int. Cl.
*H04L 25/06* (2006.01)
*H03D 3/00* (2006.01)
*H04W 4/00* (2009.01)
*H04L 27/26* (2006.01)

(52) U.S. Cl.
CPC ........ *H04L 27/2626* (2013.01); *H04L 27/2647* (2013.01)

(58) Field of Classification Search
USPC .......................................................... 375/319
See application file for complete search history.

(56) References Cited

U.S. PATENT DOCUMENTS

| 6,070,060 | A  | * | 5/2000  | Edelman ........................ 455/102 |
| 7,280,580 | B1 | * | 10/2007 | Haartsen ........................ 375/138 |
| 7,414,963 | B2 | * | 8/2008  | Kumar et al. ................... 370/206 |
| 7,512,185 | B2 | * | 3/2009  | Sharon et al. ................... 375/260 |
| 2003/0156624 | A1 | * | 8/2003 | Koslar ........................... 375/131 |
| 2005/0249174 | A1 | * | 11/2005 | Lundby et al. ................ 370/338 |
| 2005/0249266 | A1 | * | 11/2005 | Brown et al. .................. 375/133 |
| 2007/0133462 | A1 | * | 6/2007 | Guey ............................. 370/330 |

FOREIGN PATENT DOCUMENTS

WO  WO 2005/099146 A  10/2005

OTHER PUBLICATIONS

Scholand T et al.: "Fast frequency hopping OFDM concept" Electronics Letters, IEE Stevenage, GB, Bd. 41, Nr. 13, Jun. 23, 2005, pp. 748-749, XP006024654 ISSN: 0013-5194 the whole document.

* cited by examiner

Primary Examiner — Shaq Taha

(57) ABSTRACT

A method for operating a radio communication system involves the use of OFDM and involves a first sending station modulating a first OFDM symbol onto a first carrier frequency and sending the first OFDM symbol to a first receiving station via a first transmission channel using an air interface. The first sending station changes the first carrier frequency during a time used for sending the first OFDM symbol, the change in the first carrier frequency being made independently of a change in transmission characteristics of the first transmission channel over time. A fast frequency hopping system is disclosed.

20 Claims, 2 Drawing Sheets

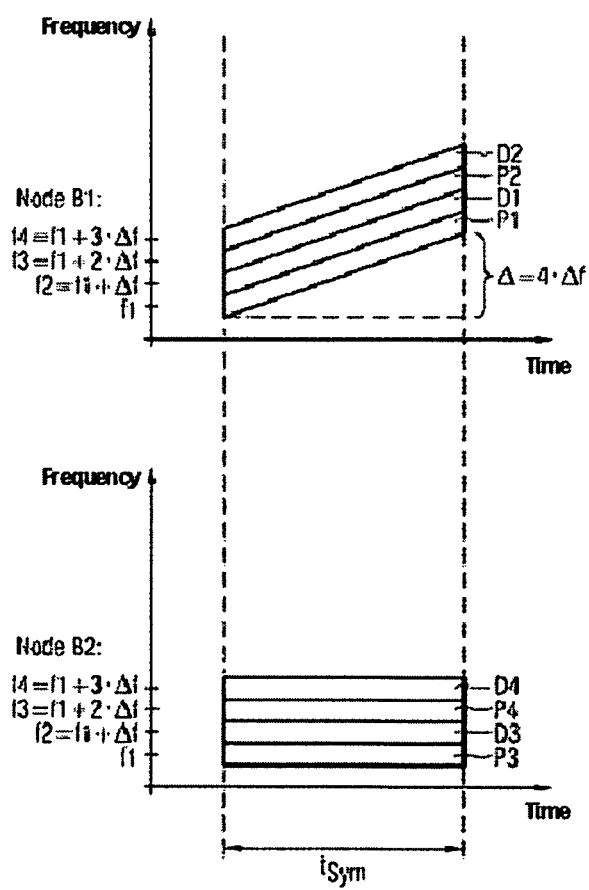

OFDM COMMUNICATION SYSTEM WITH FAST FREQUENCY HOPS

CROSS REFERENCE TO RELATED APPLICATIONS

This application is based on and hereby claims priority to PCT Application No. PCT/EP2007/060708 filed on Oct. 9, 2007 and German Application No. 10 2006 047 978.5 filed on Oct. 10, 2006, the contents of which are hereby incorporated by reference.

BACKGROUND OF THE INVENTION

The invention relates to a method for operating a radio communication system which uses OFDM, and to a corresponding radio communication system, a corresponding sending station and a corresponding receiving station.

In radio communication systems which use OFDM (Orthogonal Frequency Division Multiplex), several subcarriers are available for data transmission during the duration of one OFDM symbol. In this context, one OFDM symbol can in each case be modulated onto each subcarrier onto the respective carrier frequency and sent by a sending station, for example a base station or a subscriber station. An OFDM symbol can contain useful data and/or signaling data. Furthermore, an OFDM symbol can also be used as reference symbol and be used by a receiver for estimating the transmission channel. During the period of an OFDM symbol, one or more subcarriers can be used for sending reference symbols.

If a sending station sends a reference symbol on a carrier frequency to a receiving station for channel estimation, the reception of the reference symbol is disturbed by interferences. These are especially interferences with reference symbols which are sent by the sending station in adjacent sectors on the carrier frequency or interferences with reference symbols which other sending stations located within radio range of the receiving station are sending on the carrier frequency (inter-cell interference). To reduce these interferences and to improve the quality of the channel estimation, it was proposed in standardization meetings of the 3GPP LTE (3rd Generation Partnership Project Long Term Evolution) to distinguish reference symbols which are sent by a sending station in different sectors, by a code, i.e. a CDM (Code Division Multiplex) component. Interferences with reference symbols of other sending stations are intended to be reduced with respect to the subcarriers used for sending the reference symbols, i.e. the respective carrier frequencies, by a frequency hopping method by each sending station using a different hopping sequence.

It is also proposed to send the reference symbols with a greater transmitting power than OFDM symbols sent simultaneously on other subcarriers, i.e. on other carrier frequencies, which contain useful and/or signaling data. Increasing the transmitting power has the effect that the reference symbols are received with a better signal to noise ratio (SNR) than the OFDM symbols with useful and/or signaling data. However, this has the disadvantage that interferences between adjacent radio cells of a different sending station are increased.

SUMMARY

One potential object is to specify an advantageous method for operating a radio communication system and a corresponding radio communication system, a corresponding sending station and a corresponding receiving station, by which interferences between OFDM symbols of different sending stations can be reduced.

The inventors propose a method for operating a radio communication system, in which OFDM is used and a first sending station modulates a first OFDM symbol onto a first carrier frequency and sends the first OFDM symbol to a first receiving station via a first transmission channel, using an area interface. According to the proposed method, the first sending station changes the first carrier frequency during a time used for sending the first OFDM symbol, the changing of the first carrier frequency being carried out independently of a changing of transmission characteristics of the first transmission channel over time.

Changing the first carrier frequency makes it possible to achieve that interferences by other OFDM symbols which are modulated onto the first carrier frequency by other sending stations and are sent or received at the location of the first receiving station, at the same time as the first OFDM symbol, only occur at the beginning of the reception of the first OFDM symbol if the other sending stations in each case leave the first carrier frequency unchanged or change it differently from the first sending station.

In specifying the way in which the first carrier frequency is changed it is not taken into consideration whether the transmission characteristics of the transmission channel actually change, or will probably change, during the sending of the first OFDM symbol. In the context of the present patent application, transmission characteristics are characteristics of the transmission channel which influence the values of a channel matrix h mathematically describing the transmission channel. For example, the following holds true for a linear transmission channel which changes with time:

$$y(t)=\int_{-\infty}^{\infty} h(t,\tau) \times (t-\tau)d\tau$$

where x is the transmitted signal and y is the signal received via the transmission channel. It is thus unimportant for the change of the first carrier frequency whether and in which way the channel matrix h, also called channel impulse response, depends on the time t.

For changing the first carrier frequency it is advantageously taken into consideration which change of the first carrier frequency is provided for a second sending station in the case where the second sending station sends a second OFDM symbol on the first carrier frequency during the sending of the first OFDM symbol. The change in the first carrier frequency intended for the second sending station is thus always taken into consideration independently of whether the second sending station is actually sending or not and to whom it is sending.

In this manner, the first sending station can always change the first carrier frequency in such a manner that, if the second sending station should send the second OFDM symbol simultaneously with the first OFDM symbol, the first and the second OFDM symbols are sent with the same frequency for the least possible proportion of the time used for sending the first OFDM symbol. The radio communication system can thus be configured in such a manner that sending stations which supply adjacent radio cells change in a different manner the carrier frequencies used in each case.

In the text which follows, the time used for sending an OFDM symbol is called the period of the OFDM symbol.

A development of the method provides that the first sending station modulates, and sends synchronously with the first OFDM symbol, other OFDM symbols onto other carrier frequencies.

The first sending station advantageously changes the further carrier frequencies in the same manner as the first carrier frequency. The relative position of the carrier frequencies with respect to one another thus remains unchanged during the period of the first OFDM symbol.

The carrier frequencies are advantageously exclusively increased or decreased.

The change of the carrier frequencies advantageously occurs at least twice and has a step length which is less than the frequency spacing between two adjacent carrier frequencies.

The change of the carrier frequencies is advantageously continuous until a respective nominal value is reached.

An advantageous embodiment provides that the first OFDM symbol is sent to the receiving station as reference symbol for channel estimation. Naturally, one or more of the further OFDM symbols can also be sent synchronously to the receiving station as reference symbols for channel estimation.

The first OFDM symbol, as reference symbol, is advantageously sent with a higher transmitting power than other OFDM symbols sent synchronously, which are used for transmitting useful and/or signaling data.

In this manner, it is possible to achieve that the first receiving station receives the reference symbol with a better SNR than OFDM symbols with useful and/or signaling data, the changing of the carrier frequencies, at the same time, having the effect that the reference symbol does not generate any increased interference at other receiving stations.

The first receiving station advantageously receives the first OFDM symbol with the first carrier frequency and, during the reception of the first OFDM symbol, changes the first carrier frequency in the same manner as was used by the first sending station for sending. The first receiving station is thus enabled to decode the first OFDM symbol by adjusting its receiver at any time, during the period of the first OFDM symbol, to the frequency at which the first OFDM symbol has been sent.

The first receiving station advantageously changes the first carrier frequency in the same manner as is provided for the second sending station for sending the second OFDM symbol on the first carrier frequency.

In this way, the first receiving station, for example after having decoded the first OFDM symbol or in parallel with the decoding of the first OFDM symbol, can process the received signal again or in parallel and, instead of the first OFDM symbol or additionally to the first OFDM symbol, decode the second OFDM symbol and, for example, estimate a transmission channel to the second sending station. Such an estimate can be transmitted, for example, to the first sending station and can be used there in calculations for methods for interference cancellation.

The proposed radio communication system has all the features needed for carrying out the method. In particular, corresponding units for carrying out the method or method variants can be provided.

The proposed sending station, for a radio communication system which uses OFDM, has a transmitter for sending a first OFDM symbol to a first receiving station via a first transmission channel using an air interface, the first OFDM symbol being modulated onto a first carrier frequency. The first sending station also has a changing unit which is constructed in such a manner that the first carrier frequency is changed during a time used for sending the first OFDM symbol, the changing of the first carrier frequency being carried out independently of a changing of transmission characteristics of the first transmission channel over time. In particular, corresponding units for carrying out the method or method variants can be provided.

The proposed receiving station for a radio communication system which uses OFDM has a receiver for receiving a first OFDM symbol from a first sending station via a first transmission channel using an air interface, the first OFDM symbol being modulated onto a first carrier frequency. The first sending station also has a changing unit which is constructed in such a manner that they receive the first OFDM symbol with the first carrier frequency and, during the reception of the first OFDM symbol, change the first carrier frequency, in the same manner as was used by the first sending station for sending, the changing of the first carrier frequency being carried out independently of a changing of transmission characteristics of the first transmission channel over time. In particular, corresponding units for carrying out the method or method variants can be provided.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 2 shows a diagrammatic representation of a changing of the carrier frequencies according to the proposed method during the sending of an OFDM symbol.

DETAILED DESCRIPTION OF THE PREFERRED EMBODIMENT

Figure 1:
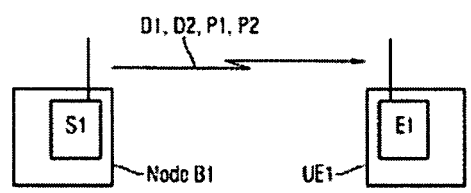
FIG. 1 shows a diagrammatic representation of a transmission of OFDM symbols according to the proposed method.
Figure 1:
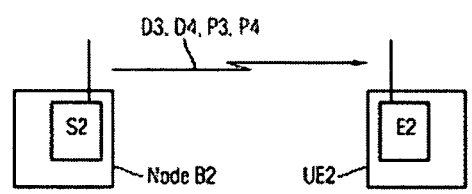

Reference will now be made in detail to the preferred embodiments of the present invention, examples of which are illustrated in the accompanying drawings, wherein like reference numerals refer to like elements throughout.

A sending station is, for example, a subscriber station or a base station.

A receiving station is, for example, a subscriber station or a base station.

A subscriber station is, for example, a mobile radio terminal, in particular a mobile telephone or also a mobile or stationary device for transmitting image and/or audio data, for fax, short message service SMS, multimedia messaging service MMS and/or email dispatch and/or for Internet access.

A base station is a radio station on a network side which receives useful data and/or signaling data from a subscriber station and/or sends useful data and/or signaling data to the subscriber station. Furthermore, a base station sends reference signals, for example reference symbols, to the subscriber station for estimating a transmission channel. Similarly, the base station can receive corresponding reference signals from the subscriber station for channel estimation. A base station is connected via facilities on the network side with a core network via which connections into other radio communication systems or into other data networks are effected: A data network is understood to be, for example, the Internet or a landline network having, for example, circuit-switched or packet-switched connections for, e.g. voice and/or data.

In the text which follows, a base station is considered as sending station without however wishing to express that the method should be restricted thereto.

In the text which follows, a subscriber station is considered as receiving station without however wishing to express that the method is to be restricted thereto.

The method can be advantageously used in any radio communication systems which use OFDM. Radio communication systems are understood to be systems in which data are transmitted between radio stations via an air interface. The data can be transmitted both bidirectionally and unidirectionally. Radio communication systems are, in particular, any mobile radio systems, for example according to the UMTS (Universal Mobile Telecommunications System) standard. Future mobile radio systems, for example of the fourth generation, and ad hoc networks are also intended to be understood to be radio communication systems. Radio communication systems are, for example, also wireless local area networks (WLANs) according to the IEEE (Institute of Electrical and Electronics Engineers) 802.11a-i, HiperLAN1 and HiperLAN2 (high performance radio local area network) standards and Bluetooth networks and Broadband networks with wireless access, for example according to IEEE 802.16.

FIG. 1 diagrammatically shows a first base station NodeB1 with a first sending unit S1 for sending OFDM symbols. The first base station NodeB1 sends four OFDM symbols simultaneously, i.e. synchronously, via a first transmission channel using an air interface. A first OFDM symbol P1 and a second OFDM symbol P2 are in each case a reference symbol, whereas a third OFDM symbol D1 and a fourth OFDM symbol D2 in each case contain useful data. The four OFDM symbols P1, P2, D1, D2 are sent by the first base station NodeB1 to a first subscriber station UE1. The reference symbols P1, P2 sent are known to the first subscriber station UE1 and are used by the first subscriber station UE1, for example by correlation with the correspondingly received reference symbols, for estimating the transmission characteristics of the first transmission channel. The first subscriber station has a first receiving unit E1 for receiving and decoding OFDM symbols.

FIG. 1 also diagrammatically shows a second base station NodeB2 with a second sending unit S2 for sending OFDM symbols. The second base station NodeB2 sends four OFDM symbols P3, P4, D3, D4 simultaneously, i.e. synchronously, via a second transmission channel using an air interface. A fifth OFDM symbol P3 and a sixth OFDM symbol P4 are in each case a reference symbol, whereas a seventh OFDM symbol D3 and an eighth OFDM symbol D4 in each case contain useful data. The four OFDM symbols P3, P4, D3, D4 are sent by the second base station NodeB2 to a second subscriber station UE2. The four OFDM symbols P3, P4, D3, D4 are sent synchronously with the four OFDM symbols P1, P2, D1, D2 sent by the first base station NodeB1. The reference symbols P3, P4 are known to the second subscriber station UE2 and are used by the second subscriber station UE2, for example by correlation with the corresponding received reference symbols, for estimating the transmission characteristics of the second transmission channel. The second subscriber station UE2 has a second receiving unit E2 for receiving and decoding OFDM symbols.

The period $t_{SYM}$ of an OFDM symbol is, for example, 66 microseconds. Each OFDM symbol is sent on one subcarrier in each case. Each subcarrier has a carrier frequency f1, f2, f3, f4 and a bandwidth $\Delta f$. The subcarriers have, for example, an identical bandwidth $\Delta f$ of 15 kHz in each case. Naturally, the subcarriers can also have different bandwidths. For example, the total bandwidth available for subcarriers in the radio communication system can be 20 MHz so that significantly more subcarriers, i.e. carrier frequencies, than those shown diagrammatically in FIG. 2 can be modulated simultaneously with, for example, one OFDM symbol in each case, and sent.

To achieve a better signal to noise ratio, reference symbols are sent, for example, with a greater transmitting power than OFDM symbols with useful data and/or signaling data sent synchronously.

During the period $t_{SYM}$ of the OFDM symbols P1, P2, D1, D2 sent, the first base station changes the respective carrier frequencies as shown in the top diagram in FIG. 2. At the beginning of the OFDM symbols P1, P2, D1, D2, the first OFDM symbol P1 is modulated onto a first carrier frequency, f1, the third OFDM symbol D1 is modulated onto a second carrier frequency $f2=f1+\Delta f$, the second OFDM symbol P2 is modulated onto a third carrier frequency $f3=f1+2*\Delta f$ and the fourth OFDM symbol D2 is modulated onto a fourth carrier frequency $f4=f1+4*\Delta f$. The first base station NodeB1 changes the carrier frequencies f1, f2, f3, f4 continuously and linearly and in the same manner in the present exemplary embodiment, during the period $t_{SYM}$. At the end of the period $t_{SYM}$, each of the OFDM symbols P1, P2, D1, D2 has a carrier frequency of in each case the initial carrier frequency f1, f2, f3 and f4, respectively, plus four times the bandwidth $\Delta f$ of a subcarrier.

Naturally, the first base station NodeB1 can also change the carrier frequencies f1, f2, f3, f4 discontinuously and differently during the period $t_{SYM}$.

During the period $t_{SYM}$, the second base station also sends its four OFDM symbols P3, P4, D3, D4 on the first, second, third and fourth carrier frequency f1, f2, f3 f4. The fifth OFDM symbol P3 is modulated onto the first carrier frequency f1, the seventh OFDM symbol D3 is modulated onto the second carrier frequency f2, the sixth OFDM symbol P4 is modulated onto the third carrier frequency f3 and the eighth OFDM symbol D4 is modulated onto the fourth carrier frequency f4. As shown in the lower diagram in FIG. 2, the second base station NodeB2 does not change the carrier frequencies used for its OFDM symbols during the period $t_{SYM}$.

The radio communication system can be configured in such a manner that a third base station which, for example, is also received by the first receiving station UE1, uses the same carrier frequencies for reference symbols and/or OFDM symbols with useful data and/or signaling data as the first and the second base station NodeB1, NodeB2, but the third base station changes the carrier frequencies, for example, during the period $t_{SYM}$, inversely to the first base station NodeB1, i.e. by $-4*\Delta M$. The carrier frequencies of other base stations can be changed correspondingly, where the changes should be different from one another in such a manner that the least possible interferences are produced in subscriber stations which are supplied by adjacent base stations.

Naturally, the radio communication system can be configured in such a manner that a base station changes the carrier frequencies used during the period of one OFDM symbol only when at least one of the OFDM symbols sent simultaneously is a reference symbol. If only OFDM symbols with useful data and/or signaling data are sent simultaneously, the carrier frequencies used are not changed during the symbol period. It can also be provided to change, during the period of an OFDM symbol which contains reference symbols, the carrier frequencies used for the reference symbols and not to modulate any useful data and/or signaling data onto other carrier frequencies or, for example, only to modulate them onto the carrier frequencies adjacent to each second or fourth reference symbol.

For the reception of the OFDM symbols P1, P2, D1, D2 sent by the first base station NodeB1, the first subscriber station UE1 changes the respective carrier frequencies, starting with f1, f2, f3 and f4, during the period $t_{SYM}$ of the OFDM symbols in the same manner as was done before by the first base station NodeB1 for sending (see top diagram in FIG. 2), before the first subscriber station UE1 processes the received signal further for decoding the OFDM symbols P1, P2, D1, D2, i.e. supplies, in particular, to an FFT (fast Fourier transformation) used in OFDM systems.

In the present exemplary embodiment, the first subscriber station UE1 and the second subscriber station UE2 are within radio range of the first and second base station NodeB1, NodeB2 and are configured in such a manner that, when they receive and decode the OFDM symbols in each case to be received, they process the respective received signal a second time in parallel. The parallel processing is carried out in such a manner that the first subscriber station UE1 and the second base station NodeB2 use carrier frequencies which are constant in time in order to be able to decode in this manner, in particular, the reference symbols P3 and P4 of the second base station NodeB2, and that the second subscriber station UE2 changes the carrier frequencies like the first base station NodeB1 in order to be able to decode in this manner, in particular, the reference symbols P1 and P2 of the first base station NodeB1.

Naturally, the method can also be used for transmissions on the uplink, i.e. for transmissions from the first subscriber station to the first base station NodeB1. For transmissions on the uplink, it can be provided to supply at least the OFDM symbols which carry useful data and/or signaling data to a DFT (discrete Fourier transformation) before carrying out the IFFT (inverse fast Fourier transformation) used in OFDM systems. In this case, the OFDM symbols subjected to the DFT are simultaneously modulated onto all subcarriers, i.e. carrier frequencies, allocated to the DFT result, i.e. these OFDM symbols are simultaneously sent on a plurality of carrier frequencies.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in Superguide v. DIRECTV, 69 USPQ2d 1865 (Fed. Cir. 2004).

The invention claimed is:

1. A method for operating a radio communication system which uses Orthogonal Frequency Division Multiplexing (OFDM), comprising:
    modulating a first symbol of an OFDM symbol onto a first carrier frequency at a first sending station to produce a first modulated signal;
    sending the first modulated signal from the first sending station to a first receiving station via a first transmission channel using an air interface;
    changing the first carrier frequency at the first sending station during a period in which the OFDM symbol is being sent, the first carrier frequency being continuously and linearly changed during the period in which the OFDM symbol is being sent, independently of changing transmission characteristics of the first transmission channel over time; and
    wherein the carrier frequency is changed at least twice and has a step length which is less than a frequency spacing between two adjacent carrier frequencies.

2. The method as claimed in claim 1, wherein, a second sending station sends a second symbol of the OFDM symbol on the first carrier frequency and changes the first carrier frequency while sending of the OFDM symbol, and for changing the first carrier frequency, the first sending station considers how the second sending station changes the first carrier frequency while sending the OFDM symbol.

3. The method as claimed in claim 1, wherein the first sending station modulates, and sends synchronously with the OFDM symbol, other OFDM symbols on other carrier frequencies.

4. The method as claimed in claim 3, wherein the first sending station changes the other carrier frequencies in the same manner as the first carrier frequency.

5. The method as claimed in claim 3, wherein the first and other carrier frequencies are exclusively increased or decreased.

6. The method as claimed in claim 1, wherein the carrier frequency is changed continuously until a respective nominal value is reached.

7. The method as claimed in claim 1, wherein the first OFDM symbol is sent to a receiving station as a reference symbol for channel estimation.

8. The method as claimed in claim 7, wherein the first transmitting station also transmits other OFDM symbols sent synchronously with the OFDM symbol,
    the other OFDM symbols are used for transmitting useful data and/or signaling data, and the first OFDM symbol is sent with a higher transmitting power than the other OFDM symbols.

9. The method as claimed in claim 1, wherein a first receiving station receives the OFDM symbol with the first carrier frequency and, during reception of the OFDM symbol, changes the first carrier frequency in a same manner as was used by the first sending station for sending the OFDM symbol.

10. The method as claimed in claim 9, wherein a second sending station sends a second symbol of the OFDM symbol on the first carrier frequency and changes the first carrier frequency while sending of the OFDM symbol, and
    the first receiving station changes the first carrier frequency in a same manner as is provided for the second sending station for sending the OFDM symbol on the first carrier frequency.

11. The method as claimed in claim 2, wherein the first sending station modulates, and sends synchronously with the OFDM symbol, other OFDM symbols on other carrier frequencies.

12. The method as claimed in claim 11, wherein the first sending station changes the other carrier frequencies in the same manner as the first carrier frequency.

13. The method as claimed in claim 12, wherein the first and other carrier frequencies are exclusively increased or decreased.

14. The method as claimed in claim 13, wherein the carrier frequencies are changed at least twice and have a step length which is less than a frequency spacing between two adjacent carrier frequencies.

15. The method as claimed in claim 14, wherein the carrier frequencies are changed continuously until a respective nominal value is reached.

16. The method as claimed in claim 15, wherein the first OFDM symbol is sent to a receiving station as a reference symbol for channel estimation.

17. A sending station for a radio communication system which uses Orthogonal Frequency Division Multiplexing (OFDM), comprising:
    a modulator to modulate a first symbol of an OFDM symbol onto a first carrier frequency; a transmitter to send the OFDM symbol to a first receiving station via a first transmission channel using an air interface;

a frequency changing unit to change the first carrier frequency during a period in which the OFDM symbol is being sent, the first carrier frequency being continuously and linearly changed during the period in which the OFDM symbol is being sent, independently of changing transmission characteristics of the first transmission channel over time; and wherein the carrier frequency is changed at least twice and has a step length which is less than a frequency spacing between two adjacent carrier frequencies.

18. A receiving station for a radio communication system which uses Orthogonal Frequency Division Multiplexing (OFDM), comprising:

a receiver to receive a first symbol of an OFDM symbol from a first sending station via a first transmission channel using an air interface, the first symbol being modulated onto a first carrier frequency with the first carrier frequency being continuously and linearly changed during a period in which the OFDM symbol is being sent;

a frequency changing unit to change the first carrier frequency while receiving the OFDM symbol, the frequency changing unit changing the first carrier frequency in a same manner as was done by the first sending station, the first carrier frequency being changed during a period in which the OFDM symbol is being sent, independently of changing transmission characteristics of the first transmission channel over time; and wherein the carrier frequency is changed at least twice and has a step length which is less than a frequency spacing between two adjacent carrier frequencies.

19. A radio communication system comprising: a first sending station as claimed in claim 17; and a receiving station comprising:

a receiver to receive the OFDM symbol from the first sending station via the first transmission channel using the air interface; and a frequency changing unit to change the first carrier frequency while receiving the OFDM symbol, the frequency changing unit changing the first carrier frequency in a same manner as was done by the first sending station, the first carrier frequency being changed independently of changing transmission characteristics of the first transmission channel over time.

20. The method of claim 1:

wherein the modulating comprises modulating a plurality of OFDM symbols, each OFDM symbol being modulated onto a different carrier frequency to generate a plurality of modulated signals;

wherein the sending comprises sending the plurality of modulated signals from the first sending station to the first receiving station; and wherein the changing comprises changing each of the plurality of different carrier frequencies by a same frequency amount during an OFDM symbol period in which the plurality of OFDM symbols are transmitted via the modulated signals.

* * * * *

UNITED STATES PATENT AND TRADEMARK OFFICE
CERTIFICATE OF CORRECTION

| | | |
|---|---|---|
| PATENT NO. | : 9,065,715 B2 | Page 1 of 1 |
| APPLICATION NO. | : 12/311760 | |
| DATED | : June 23, 2015 | |
| INVENTOR(S) | : Volker Jungnickel et al. | |

It is certified that error appears in the above-identified patent and that said Letters Patent is hereby corrected as shown below:

IN THE CLAIMS

In column 8, line 13, in claim 5, delete "claim 3," and insert -- claim 4, --, therefor.

Signed and Sealed this
Seventeenth Day of November, 2015

Michelle K. Lee
*Director of the United States Patent and Trademark Office*